United States Patent [19]
Allewitz

[11] Patent Number: 4,518,005
[45] Date of Patent: May 21, 1985

[54] GUIDED FLOAT ACCUMULATOR

[75] Inventor: Murry Allewitz, Houston, Tex.
[73] Assignee: Koomey, Inc., Brookshire, Tex.

[21] Appl. No.: 471,929
[22] Filed: Mar. 3, 1983

Related U.S. Application Data

[63] Continuation-in-part of Ser. No. 373,185, Apr. 29, 1982, abandoned.

[51] Int. Cl.[3] .......... F16L 55/04
[52] U.S. Cl. .......... 137/207; 137/433; 138/30
[58] Field of Search .......... 138/26, 30, 31; 137/207, 206, 433, 430, 439

[56] References Cited

U.S. PATENT DOCUMENTS

| | | | |
|---|---|---|---|
| 3,319,658 | 5/1967 | Mercier | 138/30 |
| 4,278,105 | 7/1981 | Koomey | 137/207 |
| 4,294,288 | 10/1981 | Murthy | 137/207 |
| 4,403,629 | 9/1983 | de Vries | 138/31 |

*Primary Examiner*—Alan Cohan
*Attorney, Agent, or Firm*—Fulbright & Jaworski

[57] ABSTRACT

A gas-liquid spherical accumulator which includes a spherical integral cast metal housing having top and bottom ports. The top port is adapted to receive a gas valve and the bottom port releasably supports a circular valve seat. A vertical guide rod is connected to the valve seat and extends upwardly in the housing. A generally cylindrical solid float is slidably mounted on the rod. The float has a rounded valve element on the bottom for seating on the valve seat closing off the bottom port. The diameter of the float is less than the diameter of the bottom port whereby the float may be removed through the port. A resilient coating is bonded on the valve seat or the valve element and preferably includes a circular ring projecting outwardly. The valve seat tapers downwardly and inwardly. A seal is positioned on the guide rod for engaging the bottom of the float for preventing gas escape. The rod, float and valve seat may be replaced with a bladder and poppet valve.

2 Claims, 2 Drawing Figures

GUIDED FLOAT ACCUMULATOR

CROSS REFERENCE TO RELATED APPLICATIONS

This application is a continuation-in-part of patent application Ser. No. 373,185, filed Apr. 29, 1982, entitled Guided Float Accumulator and now abandoned.

BACKGROUND OF THE INVENTION

It is well known to provide a guided float accumulator for providing hydraulic pressure for various hydraulic systems such as oil well blowout preventer systems as shown in U.S. Pat. No. 4,278,105. The present invention is directed to various improvements in such an accumulator.

SUMMARY

The present invention is directed to a gas-liquid spherical accumulator which has an integral cast metal housing. The housing includes top and bottom ports. The top port is adapted to receive a gas charging and releasing valve for admitting a precharged gas, such as nitrogen. The bottom port has releasably secured therein a circular valve seat assembly. A vertical guide rod is connected to the valve seat assembly and extends upwardly in the housing. A generally cylindrically shaped float is slidably mounted on the rod. The float includes a rounded valve element on the bottom for seating on the valve seat enclosing the bottom port. A resilient coating is positioned on either or both of the valve seat and the valve element for sealing. Therefore, the present accumulator provides a positive closure with the float being the only moving part in the accumulator. Preferably, the float is a solid syntactic foam material and the diameter of the float is less than the diameter of the bottom port. The float and all other parts of the accumulator may be removed and replaced without requiring the housing to be cut open and welded together.

Still a further object of the present invention is wherein the valve seat tapers downwardly and inwardly and a coating is provided on the seat which includes a circular ring on the coating projecting upwardly for sealing with the valve element.

A still further object of the present invention is the provision of a seal on the guide rod positioned below the float and positioned to engage the float when the valve element is seated on the valve seat for sealing and preventing gas from escaping from the accumulator between the float and the guide rod. Preferably, the float includes a bevel surface on the bottom around the guide rod for engaging the seal.

Yet a further object is wherein the accumulator includes a rubber bladder and poppet valve for replacing the float, guide rod and valve seat.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

Figure 1:
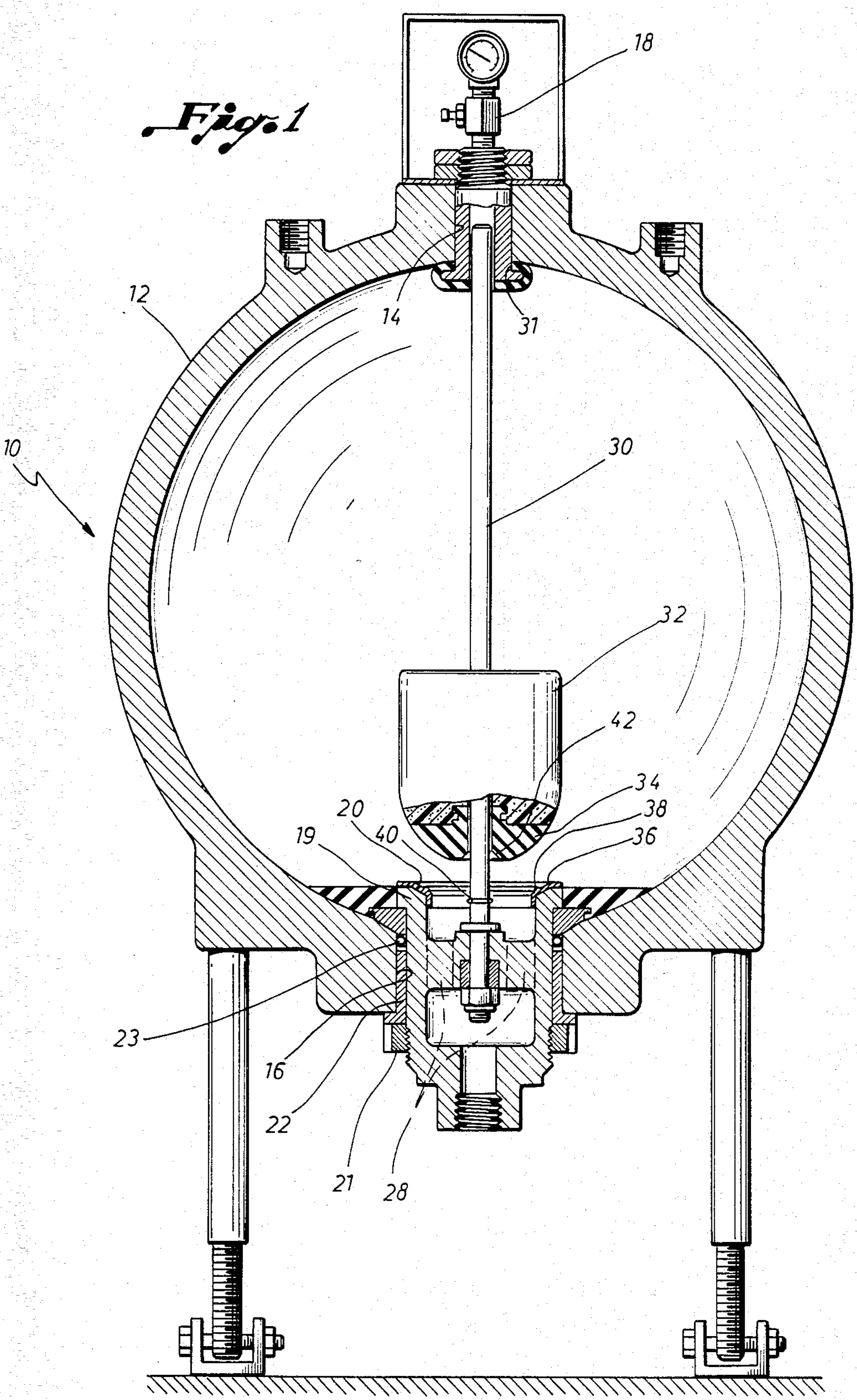
FIG. 1 is an elevational view, partly in cross-section, of the apparatus of the present invention.

Referring now to the drawings, and particularly FIG. 1, the reference numeral 10 generally indicates the gas-liquid accumulator of the present invention and generally includes a spherical integral cast metal housing 12 having a top port 14 and a bottom port 16. The housing 12 will meet all applicable codes and the construction allows all of the parts to be removed, repaired and reinserted through the ports 14 and 16 without destroying the accumulator's code of approval.

The port 14 is threadably adapted to receive any conventional gas charging and release valve 18 for the admission of a charging gas such as nitrogen. A circular valve seat 20 in an assembly 19 is releasably secured in the bottom port by a lock nut 21, spacer 22, and O ring seal 23. Fluid passageways 28 in the assembly 19 extend from below the valve seat 20 to the exterior of the housing 12 for admitting and supplying hydraulic fluid.

A vertical guide rod 30 is connected to the valve seat assembly 19 and extends coaxially upwardly in the housing and is supported by a valve stem 31.

A float 32 is slidably mounted on the rod 30. The float 32 is a solid cylindrical float having a rounded valve element 34 at the bottom for seating on the valve seat 20 and closing the bottom port. While the float 32 may be of any suitable material, a glass beaded material, such as a syntactic foam buoyancy material sold under the trademark as "ECCOFLOAT" or "WARCOFLOAT" is satisfactory. The glass beaded material retains its buoyancy in spite of any damage, is solid and does not have any cavities which would be subject to filling up with liquid and changing its buoyant characteristics, is not subject to crushing as are hollow floats, and will not deform under high pressures. Preferably, the rounded valve element 34 is of a resilient coating such as rubber to seal on the valve seat 20. The rounded bottom 34 and buoyancy of the float 32 is such that a sufficient amount of hydraulic oil remains in the housing 12 when the float 32 seats on the valve seat 20 in order to prevent any possible loss of gas through the passages 28.

It is to be noted that the cylindrical buoyant float 32 has a diameter less than the diameter of the bottom post 16 whereby the float and all of the other parts may be removed from the housing 12 through the port 16. Thus field inspection and repair of the components can be accomplished easily and quickly and does not require cutting open the housing 12 which would adversely affect compliance of the housing 12 with any standard codes such as ASME.

In order to obtain a maximum seal between the rounded bottom 34 and the valve seat 20, a resilient coating 36 such as rubber is bonded to the valve seat 20. Preferably the rubber 36 includes a circular ring 38 which projects upwardly for sealing with the rounded valve element 34. However, if desired, the seal 34 may be omitted as the resilient coating of valve element 34 may be sufficient to provide the necessary seal. The valve seat 20 tapers downwardly and inwardly for providing a wedge type sealing action.

A seal such as an O-ring 40 is positioned below the float 32 and on the guide rod 30. The seal 40 is adapted to engage the float 32 when the valve element 34 is seated on the valve seat 20. The seal 40 seals between the float 32 and the guide rod 30 and prevents gas from escaping from the accumulator between the float 32 and the guide rod 30 when the float 32 is seated. Preferably, the float 32 includes a bevel surface 42 on the bottom around the guide rod 30 for engaging the seal 40.

It is, therefore, noted that the accumulator 10 of the present invention has a positive closure, with a single moving part, the float 32, and is easily maintained and repaired.

Figure 2:
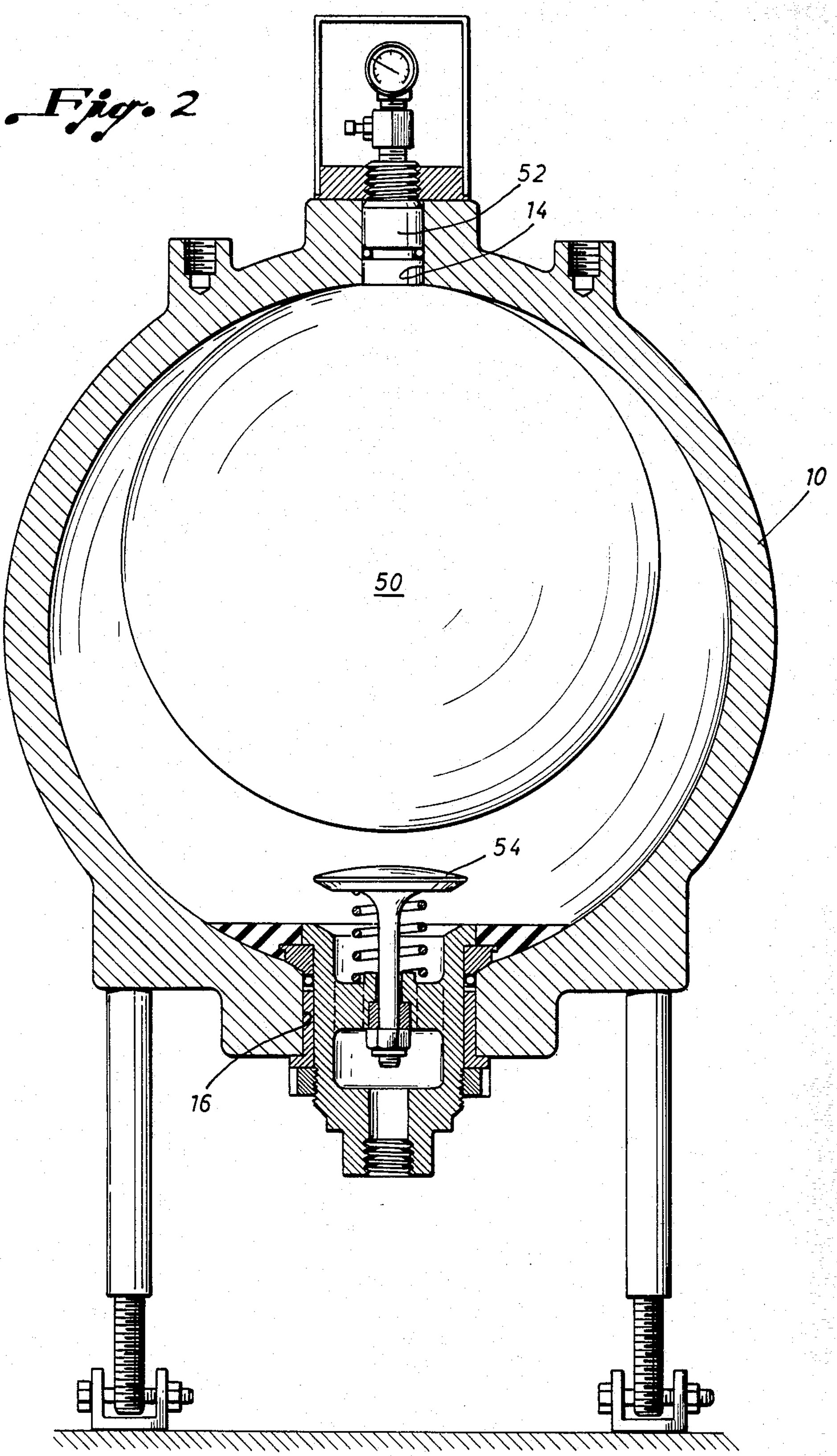
FIG. 2 is an elevational view, partly in cross-section, of the apparatus of FIG. 1 modified to have a bladder separator.

Referring now to FIG. 2, the guided float of the present invention may be easily removed and replaced with a bladder 50. The bladder 50 is advantageous in those accumulator applications where a faster response time for accumulator action is desirable. Thus the valve seat assembly 19, the guide rod 30, and the float 32 may be removed through the port 16. A bladder 50 may then be inserted through the port and attached to the port by adapter 52, and a spring loaded poppet valve 54 may be connected in the port 16 in place of the seat assembly 19. The bladder 50 will then separate the gas and liquid and will actuate the poppet valve 54 when the liquid is fully discharged from the accumulator 10.

In use, the accumulator 10 is precharged with a gas such as nitrogen through the valve 18 when the float 32 is seated on the valve seat 20. Thereafter, a supply of hydraulic fluid is injected through the passageways 28 moving the float 32 off of the seat 20 and the float 32 will float on the hydraulic fluid. As the hydraulic fluid is used, the float 32 descends and seats on the valve seat 20 to prevent gas from escaping from the housing 12. The cylindrical float 32 will displace a minimum amount of hydraulic fluid thereby increasing the usable capacity of the accumulator, but will insure that a sufficient amount of hydraulic fluid remains in the housing 12 when the float 32 seats on the valve seat 20 in order to prevent any possible loss of gas from the housing 12. The seal 40 will prevent gas from escaping from the closed accumulator from around the guide rod 30. In addition, while the float 32 is usable over a greater temperature range than the rubber elastomer bladder 50, the bladder may be substituted for the float 32 under normal operating conditions to provide a faster response for flow conditions.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit of the invention and the scope of the appended claims.

What is claimed is:

1. A gas-liquid accumulator comprising,
a spherical cast metal housing having top and bottom ports,
said top port adapted to receive a gas charging and release valve,
a circular valve seat in an assembly releasably secured in the bottom port, said seat tapering downwardly and inwardly,
a resilient coating positioned on the valve seat and having a circular ring projecting upwardly,
a vertical guide rod connected to the valve seat assembly and extending upwardly in the housing,
a generally cylindrical solid syntactic foam float slidably mounted on the rod, said float having a rounded valve element on the bottom for seating on the valve seat, the diameter of the float being less than the diameter of the bottom port whereby the float may be removed through the bottom port, said valve element including a resilient coating,
said float including a bevel surface on the bottom around the guide rod, and
a seal on the guide rod positioned below the float and positioned to engage the bevel surface when the valve element is seated on the valve seat for preventing gas from escaping from the accumulator between the float and the guide rod.

2. A gas-liquid accumulator comprising,
a spherical cast metal housing having top and bottom ports,
said top port adapted to receive a gas charging and release valve,
a circular valve seat in an assembly releasably secured in the bottom port, said seat tapering downwardly and inwardly,
a vertical guide rod connected to the valve seat assembly and extending upwardly in the housing,
a generally cylindrical solid syntactic foam float slidably mounted on the exterior of the rod, said float having a rounded bottom valve element on the bottom for seating on the valve seat, the diameter of the float being less than the diameter of the bottom port whereby the float may be removed through the bottom port,
a resiliently coating positioned on one of the seat and the valve element for providing a sealing engagement between the element and the seat, and
a seal on the exterior of the guide rod positioned below the float and positioned to engage the float when the valve element is seated on the valve seat for preventing gas from escaping from the accumulator between the float and the guide rod.

* * * * *